Oct. 11, 1949. K. RATH 2,484,735
EXTINCTION TYPE EXPOSURE METER WITH AUTOMATIC
EYE SENSITIVITY COMPENSATION
Filed Oct. 23, 1945 3 Sheets-Sheet 1
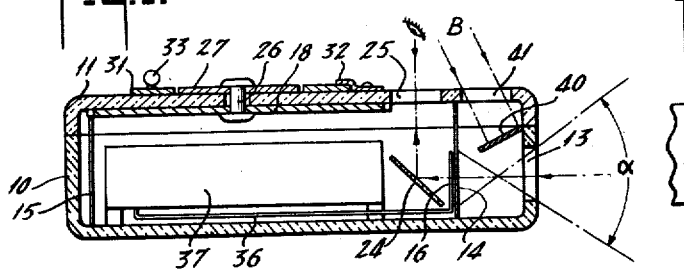
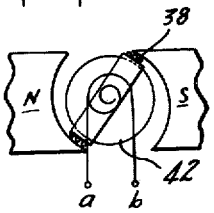
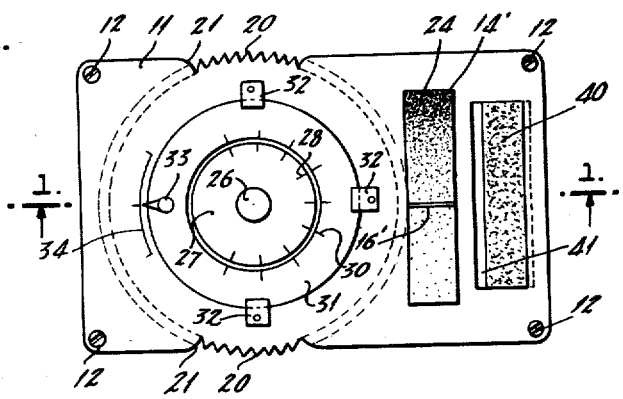
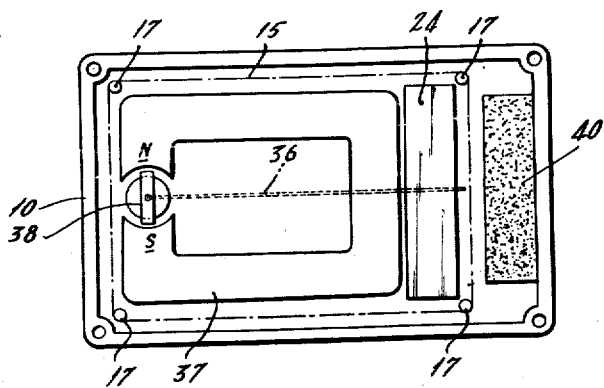
INVENTOR

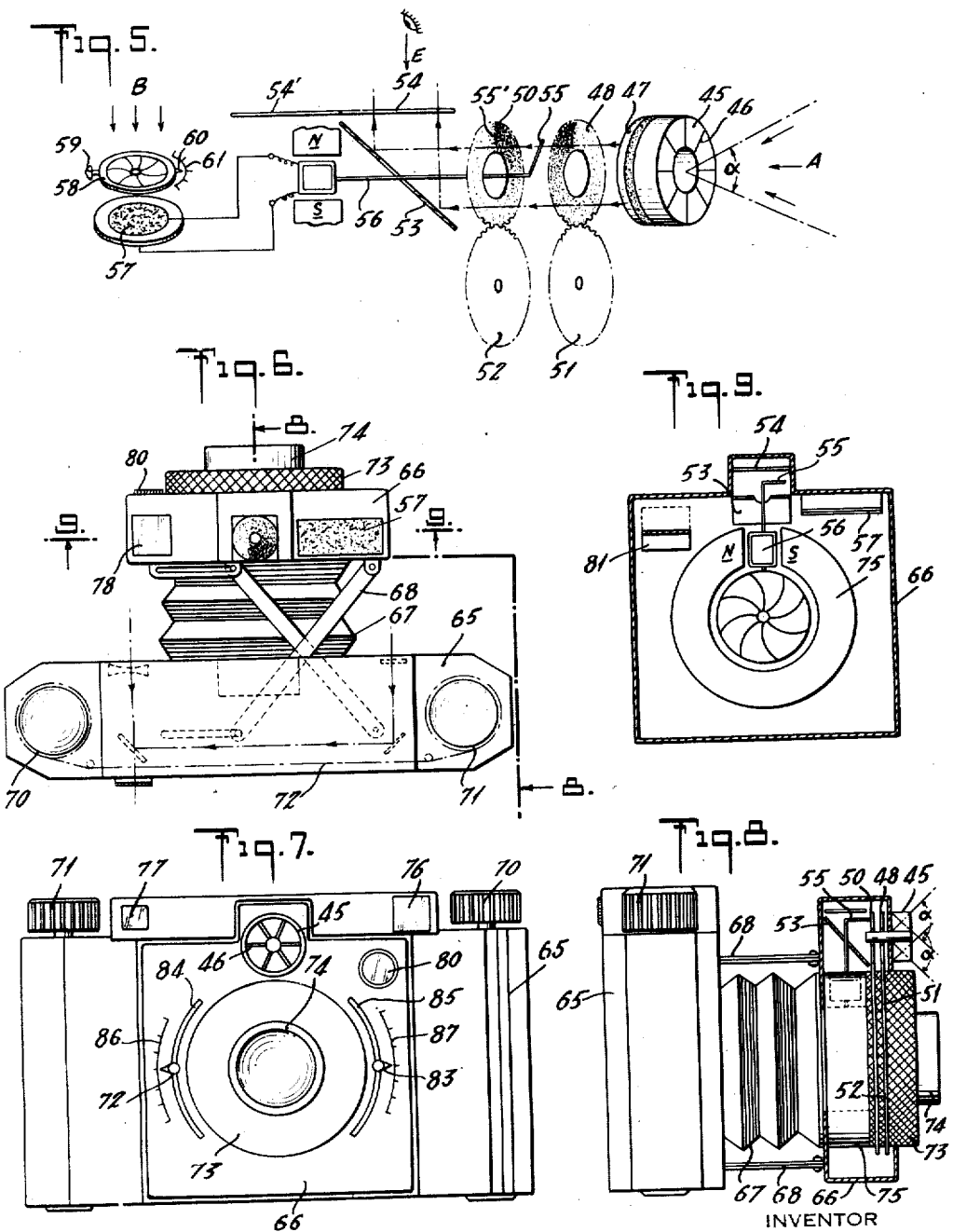

Oct. 11, 1949.    K. RATH    2,484,735
EXTINCTION TYPE EXPOSURE METER WITH AUTOMATIC
EYE SENSITIVITY COMPENSATION
Filed Oct. 23, 1945    3 Sheets-Sheet 3
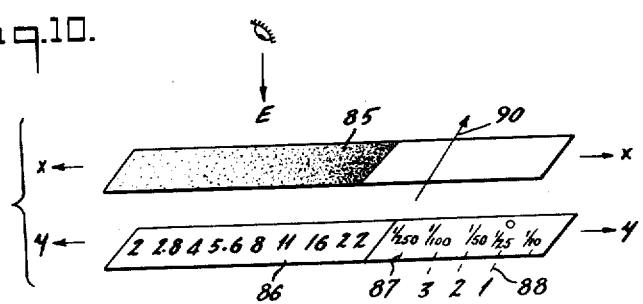
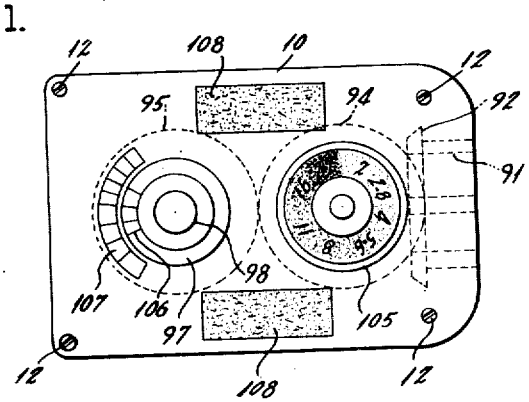
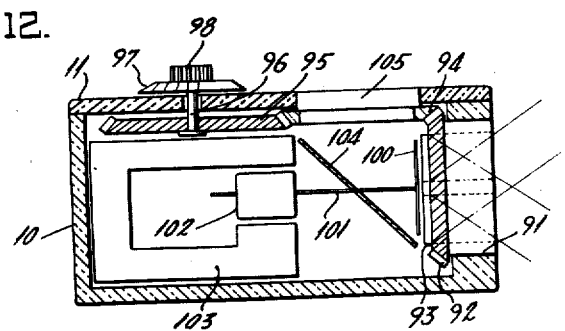
INVENTOR Patented Oct. 11, 1949

2,484,735

UNITED STATES PATENT OFFICE 2,484,735

EXTINCTION TYPE EXPOSURE METER WITH AUTOMATIC EYE SENSITIVITY COMPENSATION

Karl Rath, New York, N. Y.

Application October 23, 1945, Serial No. 623,919

3 Claims. (Cl. 88—23)

My invention relates to exposure control, more particularly to a novel arrangement for determining the correct exposure setting or adjustment of the exposure control organs of a camera in accordance with an existing scene or object brightness to insure a correctly exposed photograph.

Two basic types of exposure meters or control devices have come into general use; the optical or visual exposure meter relying on the human eye as a criterion for determining the scene or object brightness and the photoelectric meter utilizing the output current of a photoelectric cell as a basis for the scene brightness measurement.

Both of the above types of exposure meter possess advantages and disadvantages limiting their use or making necessary corrections and readjustments to insure a correct exposure under the most widely varying illumination or scene brightness conditions encountered in practice. Thus, the visual meter has the advantage that it can be used with equal accuracy over an extremely wide range of scene brightness values including scenes or subjects of the lowest brightness encountered in practical photography, in which case the electrical meter is less accurate and subject to substantial difficulties in obtaining reliable readings in an easy and simple manner. The visual meter, on the other hand, is subject to the effect of the varying eye sensitivity or to acuity of vision of the human eye, thus rendering the reading subject to substantial errors in the hands of less trained and experienced photographers.

In particular, visual exposure meters which are not held up close to the eye do not measure the same thing as meters where exterior light is excluded by an eye cup or the like and every effort is made to achieve a constant eye sensitivity so that one measures the actual subject brightness. But when the meter is held at a distance from the eye, the exterior light exercises a profound effect due to the varying eye sensitivity and one is in fact comparing the reflected brightness of the subject with the general surrounding light which falls upon it. Accordingly, visual meters of this type known in the art require substantial correcting factors for the surrounding light condition. Since this "light condition" has to be estimated, there is a rather dangerous source of error. In fact, one might almost claim that these meters are measuring the average reflection factor of the subject only.

As pointed out, however, visual meters as a rule can be used wherever one can see and possess ample sensitivity, while in the photoelectric meter extreme sensitiveness requires a large photocell and a more delicate indicator, so that to combine sensitiveness with small size and cheapness is not easy to achieve.

Accordingly, an object of the present invention is the provision of an exposure determining device which substantially combines the advantages of both the visual and the electric meter; which is simple in construction and easy to operate; which insures correct exposure readings within the widest scene or subject brightness range encountered in practice; which can be used in a convenient position at a distance from the observer's eye; which is capable of affording an instantaneous reading; which is substantially free from the error due to the personal element due to the effect of the varying acuity of vision or eye sensitivity; which can be used either as a separate accessory of a camera or which can be structurally combined with the exposure adjustments of said camera; which is rugged in construction and relatively cheap to manufacture compared with electrical exposure meters of the type presently known; and wherein the effect of the varying eye sensitivity under varying light conditions is automatically accounted for or considered without guessing or estimation and without special experience on the part of the photographer.

These and further objects of the invention will become more apparent from the following detailed description taken in reference to the accompanying drawings forming part of this specification, and wherein:

Figure 1 is a longitudinal cross-sectional view of an exposure meter construction embodying the principles of the invention;

Figure 2 is a diagram showing a preferred construction of the electric indicator embodied in Figure 1;

Figure 3 is a top view of the meter shown in Figure 1;

Figure 4 is a similar top view of the meter shown in Figure 1 with the cover removed therefrom;

Figure 5 is a diagrammatic view of an exposure control system according to the invention, suitable for structural combination with a camera;

Figure 6 is a top view and Figure 7 is a front view of a practical camera construction embodying exposure control apparatus of the type shown in Figure 5;

Figure 8 is a side view partly shown in section taken on line 8—8 of Figure 6;

Figure 9 is a further sectional view taken on line 9—9 of Figure 6;

Figure 10 is a schematic view illustrating a modified type of an exposure meter construction according to the invention;

Figure 11 is a top view of a meter construction embodying the principles of Figure 10; and Figure 12 is a sectional view taken on line 12—12 of Figure 11.

Like reference characters identify like parts throughout the different views of the drawings.

Referring more particularly to Figures 1-4, I have shown an exposure meter according to the invention suitable as a separate accessory for a camera and mounted in a rectangular casing of metal or preferably a composition material such as Bakelite, etc., said casing having a bottom portion 10 and top or cover 11 secured to the former in any suitable manner such as by screws 12. The front end of the casing has a rectangular slot or light-emitting opening 13 to admit light rays from a photographic subject or scene into the interior of the casing in the operative position upon properly aiming the opening 13 towards a subject or scene to be photographed.

At a predetermined distance behind the opening 13 there is arranged a photometric or graduated neutral density, preferably light diffusing, wedge 14 applied to or mounted upon an endless band 15 of celluloid or similar translucent or semi-transparent material. The band 15 is mounted for movement past an index 16, which for the time being will be regarded as fixed or stationary, by the provision of four guide posts or rollers 17 suitably mounted in the bottom of the lower casing part 10. In order to move the wedge 14, band 15 is provided with a series of perforations along its upper edge in a manner similar to a moving picture film, said perforations being engaged by the teeth or sprockets of a disk 18 rotatably mounted in the top 11 and operable by holding the meter and engaging either of the parts 20 of disk 18 exposed in suitable recesses 21 of the cover 11, by the thumb of the hand.

In this manner, while pointing the meter in the direction of the subject or scene to be photographed, the wedge may be continuously moved past the index 16, which latter has the form of a thin rod or needle transverse to the wedge and described in greater detail hereafter.

Mounted behind the wedge 14 and index 16 is a mirror or reflector 24 for directing the light rays entering the meter in an upward direction towards a viewing opening or slot 25 in the top 11, as indicated by the arrows in the drawing. In this manner an image 14' of wedge 14 and an image 16' of index 16 will appear in the viewing slot 25, whereby, by moving the wedge by rotating the disk 18, the outline of index 16' may be caused to disappear or merge with the wedge 14'. The extent of rotation necessary to cause the index to just disappear or become barely visible is then a measure of the intensity of the light rays entering the meter, that is, in turn, of the subject or scene brightness to be determined.

The adjustment of the wedge to the extinction point of the index 16' may be translated into the proper exposure control values of a camera in any suitable manner known in the art. Thus, in the example shown, the disk 18 has a shaft or rivet 26 mounted in an opening of the top 11 and carrying a scale disk 27 resting upon the outer surface of the casing. Disk 27 thus being rotatable together with disk 18 in accordance with the adjustment of the wedge 14, is provided with a first scale 28 arranged to cooperate with a second scale 30 applied to a ring-shaped further rotatable scale member 31 encircling the disk 27 and mounted or held by suitable guides or brackets 32, or in any other suitable manner. Disk 31 has an adjusting knob 33 which is provided with an index cooperating with a fixed scale 34 applied directly to the outer face of the cover 11.

In an arrangement of the type aforedescribed, if the scales 28 and 30 represent lens aperture and exposure times, or vice versa, and if scale 34 represents film speeds, initial adjustment of the scale member 31 for the speed of the film or plate used and subsequent adjustment of scale member 27 by moving the wedge to a position of extinction of the image 16' of the index 16 by the image 14' of the wedge 14 in the viewing slot 25, will result in a proper alignment of the scales 28 and 30 in such a manner that any desired pair of coordinated aperture and exposure times may be selected by the photographer for adjusting the camera controls to insure a correctly exposed picture under the existing scene or subject brightness conditions.

In order to properly correlate the movement of the wedge and scale members, suitable intermediate transmission elements may be provided such as one or more intermediate gears interposed between the disk 18 and the perforated edge of the band 15 carrying the wedge 14.

In the foregoing, the position of index 16 has been assumed as stationary. With a stationary index, however, the extinction adjustment as described will be largely dependent upon the acuity of vision or sensitiveness of the human eye, which in turn depends on the general illumination or "light condition" to which the eye is exposed.

Thus, considering a photographic subject of a given brightness and encompassed by the view or acceptance angle a of the meter in the operative position (this angle being determined in a known manner by the distance of the opening 13 from the wedge 14, or by any other well known acceptance angle limiting means), and assuming at first a medium illumination or light condition (lightly clouded sky), adjustment of wedge 14 to a point of extinguishment of the index 16 will then result in a certain exposure (lens aperture and correlated exposure time) read from the calculator on the top or cover 11 in the manner described above.

With the brightness of the subject remaining constant, if now the light condition changes in the dark direction (i. e., to a deeply clouded sky, to a shadow scene, etc.), the increased sensitiveness of the eye or greater capacity of the eye to distinguish between detail will result in the necessity of moving the wedge 14 to a point where a denser portion thereof will be opposite to the index 16 in the extinction position of the latter, that is, resulting in a greater light intensity measurement and accordingly an underexposed picture. Vice versa, if the light condition changes in the bright direction (i. e., to a sunny sky, etc.), the reduced eye sensitivity will result in an overexposed picture, as is well understood by those skilled in the art.

In my U. S. Patent No. 2,321,420, I have described a system of this type wherein the index cooperating with a movable wedge is adjusted manually relative to said wedge according to a prearranged scale representing light conditions which have to be guessed or estimated by the photographer.

According to the present invention, the adjustment of the index to account for or consider the effect of the varying eye sensitivity in the final exposure determination is completely automatic and substantially free from the personal factor, whereby to insure a correct exposure under any conditions without requiring special training and experience in judging or estimating the light conditions. For this purpose, the index is carried by the movable element of an electric indicating instrument which is energized by a photovoltaic cell arranged to be excited by light rays representing the general illumination or light condition to which the observer's eye is exposed. Since the deflection of the instrument is proportional to the light intensity affecting the photovoltaic cell, the extinction index will be automatically adjusted and is so arranged and coordinated with the wedge movement as to properly take into account the effect of the eye sensitivity or varying acuity of vision under the varying light conditions, substantially independently of the personal factor and free from other defects and disadvantages inherent in meters of this type heretofore known and used in the art.

For this purpose, in the example shown in the drawing, the index 16 is constituted by the end of the pointer or needle 36 of a microammeter type instrument mounted in the casing 10 and having a permanent magnet 37 provided with an air gap to accommodate a rotatable moving coil 38 which carries the pointer or needle 36. Constructional details of the meter and other elements are well known in the art and have been omitted from the drawing for ease of illustration and disclosure. The end portion 16 of the needle 36 is bent at a right angle to provide an index or test element close and transverse to and moving substantially in the direction of the wedge movement.

The photovoltaic cell 40 which may be of the known blocking layer type, such as a selenium or cupreous oxide cell, is directly electrically connected to the moving coil 38 of the indicator through suitable conductors (not shown). In the example shown, the cell is mounted in the front part of the casing in spaced relation to a further opening 41 in the cover 11, which opening may be covered by a transparent or translucent plate, if desired. The cell is shown slightly slanting towards the rear, whereby to be exposed to the light rays B known as highlights and representing the general light condition to which the observer's eye is exposed.

The arrangement of the photometric wedge 14 and the connection of the instrument to the photovoltaic cell as well as their design and physical correlation are such that the index 16 moves in a direction of decreasing wedge density as the general lighting conditions increase, and vice versa, whereby to compensate for the effects of the varying eye sensitivity or acuity of vision in a manner readily understood from the foregoing.

Since the rate of decrease of the eye sensitiveness with an increase of the highlights or light condition is non-linear, that is, since the eye becomes less and less sensitive in distinguishing relative brightness differences to a continuously increasing degree as the surrounding illumination becomes brighter, provision is made according to a further feature of the invention to cause the deflection of index 16 to increase in a non-linear fashion in such a manner as to vary the position of the index in substantially direct proportion to the change of the eye sensitivity. This is accomplished by shaping the pole pieces N and S of the electrical instrument in such a manner as to cause the air gap therebetween and a central iron core 42 in which the coil 38 is positioned to increase as the deflection of the coil increases in accordance with increasing general illumination. Such a meter construction is illustrated more clearly in Figure 2 of the drawing.

Referring to the latter, the arrangement and design of the meter is such that for very low light conditions the deflection of the pointer or moving coil 38 remains substantially zero, corresponding to the position shown in Figure 2, and maintains this position over a substantial range in view of the rather low sensitivity of the electrical meter for low light intensities. The photometric wedge 14 and the calculator are so designed as to give correct readings under these conditions and over a given range of relatively low illumination or light conditions (interior scenes, deep shadows, etc.).

If the light conditions increase beyond this lower range, the moving coil will be gradually deflected, whereby to move the index 16 to ever-decreasing deflecting positions in substantial proportion to the decrease of the eye sensitiveness and in such a manner as to properly take into consideration and compensate for the eye sensitivity error in the manner understood from the foregoing. In this manner, the low sensitivity of the electrical meter for low light intensities will not be a handicap and accordingly a less sensitive and rugged meter may be employed resulting in reduced cost and other advantages, as is understood.

The eye sensitivity decreases substantially logarithmically as the general lighting conditions increase, and accordingly the electric meter should have a logarithmic response for exact compensation. This may be obtained by the proper shaping of the pole pieces as shown in Figure 2. Other means to obtain a logarithmic response curve consist in using a more simple and cheaper meter construction having a constant air gap width and to insert a fixed high ohmic resistance (about 1,000–2,000 ohms) in series with the photovoltaic cell and the meter to change the normally linear current-light intensity characteristic into a characteristic substantially approximating a logarithmic relation.

Referring to Figure 5, I have shown schematically an exposure control system according to the invention suitable for structural combination with a camera. Item 45 is an annular shaped hood or baffle having radial partitions 46 to provide a limited acceptance angle α for the light rays A emanating from a photographic subject. Mounted behind the light baffle 45 is a disk 47 of light-diffusing material such as frosted glass or the like and followed by a pair of spaced annular rotatable and concentric photometric wedges 48 and 50, each being directly coupled to one of the adjustments 51 and 52 of a camera. Item 51 may represent the lens aperture adjustment and 52 may be the exposure time adjustment, or vice versa.

The light rays, after passing the diffusing disk 47 and wedges 48 and 50, are deflected at right angle by a mirror or reflector 53 towards a viewing slot which may be covered by a non-diffusing neutral density filter 54 having sections of variable density to be selectively placed in position over the slot (one further section 54 being shown in the drawing) for considering additional exposure determining factors such as film speed. Index 55 formed by the transversely bent end of a pointer or needle 56 of an indicating instrument is arranged to move between the wedges 49 and 50 to produce a shadow image or comparison mark 55' to serve as a basis or index for the extinction adjustment.

The meter has a moving coil directly electrically connected to a photovoltaic cell 57 and which carries the needle 56 passing through a suitable central opening in the mirror 53. The photovoltaic cell 57 is excited by light rays B proportional to the general light conditions and which may be controlled by an adjustable dimming device to consider additional factors determining the exposure of a camera. There is shown for this purpose an iris diaphragm 58 having an adjusting knob 59 and an index 60 cooperating with a stationary scale 61 representing film speed, filter factors or any other value entering into the exposure determination. Any other light modifier or sensitivity control in place of the diaphragm 58 may be employed, such as a graduated wedge placed over the photoelectric cell 57 or a variable electrical resistance connected in series with or parallel to the instrument.

In operation, either the lens aperture or exposure time may be set to a desired value by adjusting members 51 and 52, respectively, whereupon the coordinated adjustment is set to a point where the index is extinguished to result in a proper setting of the camera controls which will insure a correctly exposed photograph.

Other details of the operation will be readily understood from the description of the meter shown in Figures 1 to 4.

Figures 6–9 illustrate by way of example a camera of the collapsible bellows type embodying an exposure control apparatus of the type shown in Figure 5. The camera shown comprises in a known manner a body 65 and a lens or shutter casing 66 connected to said body by bellows 67 and collapsible linkage mechanism 68. Items 70 and 71 indicate the film winding spools for moving a film 72 past the picture gate in the focal plane of the camera, item 73 is a shutter, and item 74 a lens suitably mounted in the casing 66. The exposure meter is also mounted in the casing 66 behind and above the shutter 73 and the parts and connections are similar and correspond to the arrangement of Figure 5, as is readily understood from the drawing. The magnet 75 of the indicator is of annular shape and mounted directly behind the shutter 73.

Other details of the camera shown are of standard design, such as the view finder 76, the range finder window 77, the stop and aperture adjustments 82 and 83 movable within arcuate slots 84 and 85 in the front of casing 66 and cooperating with corresponding scales 86 and 87, respectively.

There is furthermore shown an additional brilliant view finder having elements 78, 80 and 81 and mounted in the front casing 62 to identify and to properly point the camera in the direction of the subject during the exposure control or adjustment. As is understood, the subject field encompassed by this finder coincides with the field encompassed by the exposure meter as well as the picture field of the camera objective.

According to a further embodiment of the invention, as shown in a schematic manner in Figure 10, the meter may be constructed for a direct reading of an exposure value (lens aperture or exposure time), with all the other settings such as the selected coordinated exposure value, film speed, etc., to be made in advance and remaining fixed or constant as long as desired by the photographer.

Thus, referring to Figure 10, an optical wedge 85 is directly superposed upon a scale member 86 provided with graduations representing a lens aperture scale in the example illustrated. This constitutes a known light gauge element which, when viewed in the direction of the arrow E, indicates directly the proper lens aperture by reading the number which appears just barely visible, in a manner well known in the art. In order to consider varying exposure times and film speeds, element 86 is shown to have an extension carrying an exposure time scale 87 arranged to cooperate with a fixed film speed scale 88.

Accordingly, by setting member 86 in such a manner that a chosen exposure time on scale 87 is opposite to the speed number of the particular film or plate used on scale 88 (arbitrary film speed numbers 1, 2 and 3, representing low, medium and high speed films and each being twice as fast as the preceding one being shown in the drawings for simplicity), the proper lens aperture may be directly read substantially without any additional adjustments or manipulations during the actual exposure determination. As is understood, the aperture and exposure time scales may be interchanged, in which case the meter will afford a direct reading of the required shutter speed for a previously selected lens aperture.

In order to consider the varying eye sensitivity in the final exposure reading, member 85 is arranged for direct adjustment by the moving coil of the electrical meter responsive to the highlights or surrounding light condition in a manner understood from the foregoing, and indicated schematically by the pointer or indicator 90. In other words, both members 85 and 86 of the light gauge are relatively longitudinally and initially adjustable, as indicated by the arrows x—x and y—y, respectively, in the drawing.

A constructional form of a meter of this type is shown in Figs. 11 and 12. In the latter, item 91 is an annular or ring-shaped baffle similar to the baffle 45 of Figure 5 and rotatably mounted in the front wall of casing 10. A ring-shaped bevel gear 92 and an annular photometric wedge 93 are secured to the rear end of said baffle in the manner shown in the drawing. Gear 92 cooperates with a further ring-shaped bevel gear 94 at right angle to the former and mounted underneath the top or cover 11. Gear 94 in turn meshes with a further gear 95 carried by a shaft 96 which is journalled in the top 11 and has secured to its outer end a scale disk or dial 97 and adjusting knob 98. The various gears may be further suitably supported by guides or brackets, as is understood.

Directly behind the wedge 93 and parallel thereto is a scale disk 100 attached centrally and at right angles to the shaft or needle 101 of the moving coil 102 of a galvanometer type electrical indicator having a permanent magnet 103. A mirror 104 centrally perforated to pass the needle 101 serves to project an image of the light gauge element comprised of the wedge 92 and scale disk 100 towards an aperture or viewing opening 105 in the top or cover 11.

The dial 97 is provided with the first scale 106 arranged to cooperate with a further scale 107 fixedly applied to the cover 11. In the example shown, disk 100, which is operated by the electrical indicator, carries an aperture scale which may be either in the form of opaque numbers applied to a transparent background or in the form of transparent numbers applied to opaque material similar to a stencil. In this case, scale 106 represents film speeds and scale 107 represents shutter speeds. Two photoelectric cells 108 are mounted on both sides of the opening 105 and adjusting dial 97, to increase the total photoelectric current by connecting the cells in parallel and to the electrical indicator through conducting wires or the like.

It is understood that the meter shown in Figures 11 and 12 may be easily modified for operation similar to the operation of the meter shown in Figures 1-4. All that is necessary for this purpose is to provide disk 100 with a single index and to calibrate the scales 106 and 107 in lens apertures and exposure times. In addition, scale 107 is made adjustable for cooperation with a fixed film speed scale in substantially the same manner as shown in Figure 3.

According to a further feature of this invention, the electrical meter may be used separately as a so-called highlight exposure meter. All that is required for this purpose is the provision of a suitable scale representing light values in cooperation with the pointer or needle of the meter. Such a scale may be advantageously provided adjacent to the aperture 24 of Figure 3 and cooperating with the index 16'. The light value read in this manner may then be converted into proper exposure values by the aid of a separate computor or slide-rule type calculator suitably mounted upon the meter casing in a manner well known and understood by those skilled in the art.

The exposure meter, according to the present invention, is especially suitable for obtaining so-called shadow readings to avoid the error in the average or integrated measurement of the light emanating from a photographic scene due to the variation of the relative dark and bright areas of said scene. To avoid this error, it has been suggested to use an exposure meter so as to measure the amount of light coming from the deepest shadow portion of the scene and to expose for this region and let the highlights take care of themselves. However, electric meters, as pointed out, are too insensitive for low brightness values so that this method has not been found to be widely practical with meters of this type. By using a meter according to the invention, the above defect is substantially eliminated.

If an exposure meter normally designed for average or integrated light measurement is used in the aforementioned manner by exposing on the deepest shadows of a scene which it is desired to still render correctly in its tonal value relative to the remaining scene portions (such as by approaching the subject or varying the acceptance angle of the meter), a correction will be necessary by reducing the exposure indicated by about one-eighth for the average photographic emulsion at present being commercially available. Alternatively, the meter constructed in accordance with the present invention may be provided with a further extinction mark in addition to the main extinction mark (16 according to Fig. 1), said additional extinction mark being properly displaced relative to the main extinction mark and identified for use when a shadow measurement is desired in place of an exposure based on the average or integrated total brightness of a scene.

Such a meter may be constructed, for instance, in the manner shown in Figures 11 and 12 by providing the disk 100 attached to the shaft or needle of the electrical instrument with two radial lines, one for use for average or integrated light measurement and the other to be used when a shadow measurement is desired, in place of the lens aperture numbers now shown in the drawing. If, furthermore, scales 106 and 107 represent exposure time and aperture values, or vice versa, proper alignment of the scale will be obtained by causing the respective index lines to disappear in the viewing slot upon rotation of the adjusting knob 98. The index lines have to be properly spaced angularly so as to result in an exposure when using the line provided for the shadow measurement equal to about one eighth of the exposure obtained by using the line corresponding to an average or integrated light measurement. Both lines may be suitably identified by letters, different colors, etc., such as shown and described in greater detail in my copending application Serial No. 565,217, filed November 27, 1944, and entitled Exposure control system.

While I have shown and described a few desirable embodiments of my invention, it is understood that this disclosure is for the purpose of illustration and the various changes in shape, proportion and arrangement of parts, as well as the substitution of equivalent elements for those herein shown and described may be made without departing from the scope and spirit of the invention as defined in the appended claims. The specification and drawings are accordingly to be regarded in an illustrative, rather than a restrictive, sense.

I claim:

1. In a photographic exposure determining device, an extinction type light meter comprising a body, a photometric wedge mounted upon said body and arranged to have one side thereof irradiated by light rays emanating from a photographic scene in the operative position of said device, an index element arranged in the path of said light rays to produce a test mark upon said wedge, when said wedge held at a distance from the observer's eye is viewed in a direction opposite to said light rays, adjusting means for moving said wedge relative to said body and past said index element, whereby the extent of displacement to cause said mark to become just barely visible is a measure of the scene brightness, exposure determining means carried by said body comprising adjustable means positively coupled with said adjusting means, a photovoltaic cell arranged relative to said wedge to be excited, in the operative position of said device, by light varying according to the general light conditions surrounding said scene and to which the observer's eye is exposed, an electrical indicator comprising a magnet having a pair of pole pieces, a central core therebetween and a moving coil carrying said index element and rotatably mounted within the gap between said pole pieces and said core, said gap increasing in width with increasing deflection from zero of said moving coil, circuit connections from said moving coil to said cell to adjust the position of said index element in the direction of decreasing wedge density as said light conditions change from dark to brighter and vice-versa, to thereby substantially compensate for the adjusting error of said meter due to the varying eye sensitivity of the observer under different general light conditions.

2. In a photographic exposure determining device, an extinction type light meter comprising a body, a photometric wedge mounted upon said body and arranged to have one side thereof irradiated by light rays emanating from a photographic scene in the operative position of said device, an index element arranged in the path of said light rays to produce a test mark upon said wedge, when said wedge held at a distance from the observer's eye is viewed in a direction opposite to said light rays, adjusting means for moving said wedge relative to said body and past said index element, whereby the extent of displacement to cause said mark to become just barely visible is a measure of the scene brightness, an exposure calculator comprising at least one scale member carrying an exposure scale and adjustable relative to said body, positive coupling means between said scale member and said adjusting means, a photovoltaic cell arranged relative to said wedge to be excited, in the operative position of said device, by light varying according to the general light conditions surrounding said scene and to which the observer's eye is exposed, an electrical indicator comprising a magnet having a pair of pole pieces, a central core therebetween and a moving coil carrying said index element and rotatably mounted within the gap between said pole pieces and said core, said gap increasing in width with increasing deflection from zero of said moving coil, circuit connections from said moving coil to said cell to adjust the position of said index element in the direction of decreasing wedge density as said light conditions change from dark to brighter and vice-versa, to thereby substantially compensate for the adjusting error of said meter due to the varying eye sensitivity of the observer under different general light conditions.

3. In a photographic exposure determining device, an extinction type light meter comprising a body, a photometric wedge mounted upon said body and arranged to have one side thereof irradiated by light rays emanating from a photographic scene in the operative position of said device, an index element arranged in the path of said light rays to produce a test mark upon said wedge, when said wedge held at a distance from the observer's eye is viewed in a direction opposite to said light rays, adjusting means for moving said wedge relative to said body and past said index element, whereby the extent of displacement to cause said mark to become just barely visible is a measure of the scene brightness, an exposure calculator comprising an adjustable scale member positively coupled with said adjusting means and cooperating lens aperture and shutter speed scale arranged upon said member and said body, a photovoltaic cell arranged relative to said wedge to be excited, in the operative position of said device, by light varying according to the general light conditions surrounding said scene and to which the observer's eye is exposed, an electrical indicator comprising a magnet having a pair of pole pieces, a central core therebetween and a moving coil carrying said index element and rotatably mounted within the gap between said pole pieces and said core, said gap increasing in width with increasing deflection from zero of said moving coil, circuit connections from said moving coil to said cell to adjust the position of said index element in the direction of decreasing wedge density as said light conditions change from dark to brighter and vice-versa, to thereby substantially compensate for the adjusting error of said meter due to the varying eye sensitivity of the observer under different general light conditions.

KARL RATH.

REFERENCES CITED

The following references are of record in the file of this patent:

UNITED STATES PATENTS

| Number | Name | Date |
| --- | --- | --- |
| 2,029,170 | Hull | Jan. 28, 1936 |
| 2,243,883 | Leber | May 27, 1941 |
| 2,247,323 | Tonnies | June 24, 1941 |
| 2,321,420 | Rath | June 8, 1943 |
| 2,346,529 | Whittenton | Apr. 11, 1944 |
| 2,354,544 | Rath | July 25, 1944 |
| 2,378,433 | Riszdorfer | June 19, 1945 |
| 2,379,102 | Rath | June 26, 1945 |
| 2,387,466 | Rath | Oct. 23, 1945 |

OTHER REFERENCES

Ser. No. 357,992 (A. P. C.), pub. May 4, 1943.